Feb. 14, 1956 F. W. REYNOLDS ET AL 2,734,478
APPARATUS FOR FABRICATING A COMPOSITE ELECTRICAL CONDUCTOR
Filed Dec. 29, 1951 4 Sheets-Sheet 1

INVENTORS: F. W. REYNOLDS
G. R. STILWELL
BY
Hugh S. Wertz
ATTORNEY

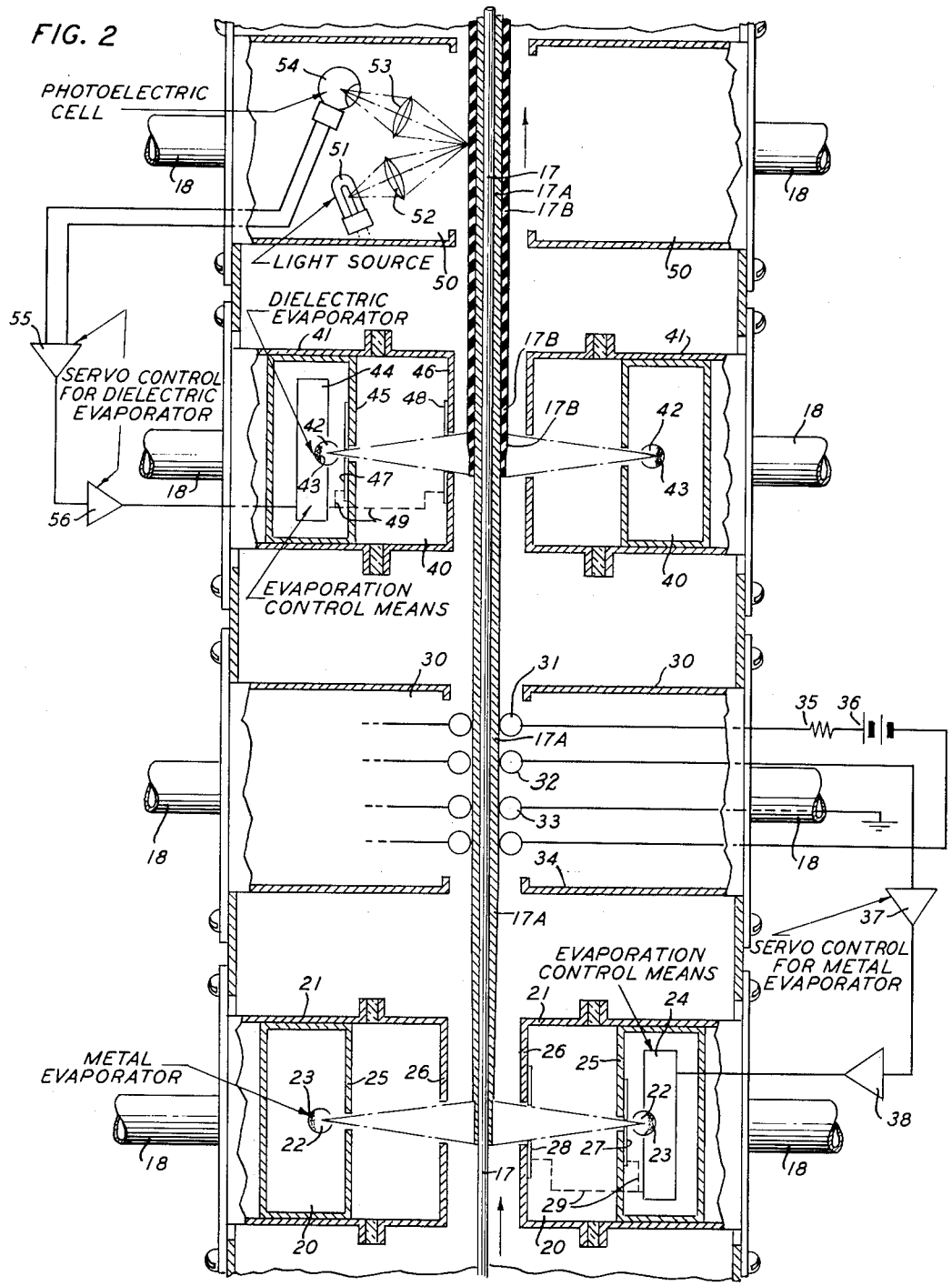

Feb. 14, 1956     F. W. REYNOLDS ET AL     2,734,478
APPARATUS FOR FABRICATING A COMPOSITE ELECTRICAL CONDUCTOR
Filed Dec. 29, 1951     4 Sheets-Sheet 3
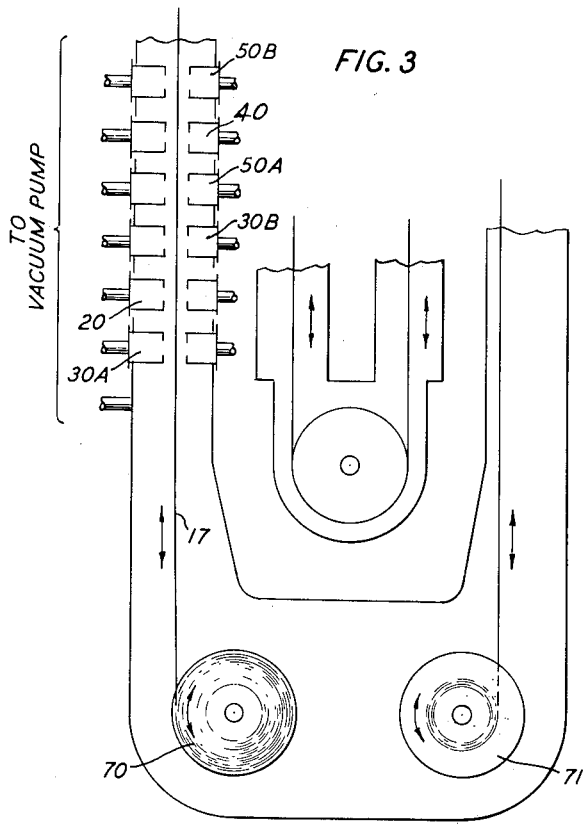
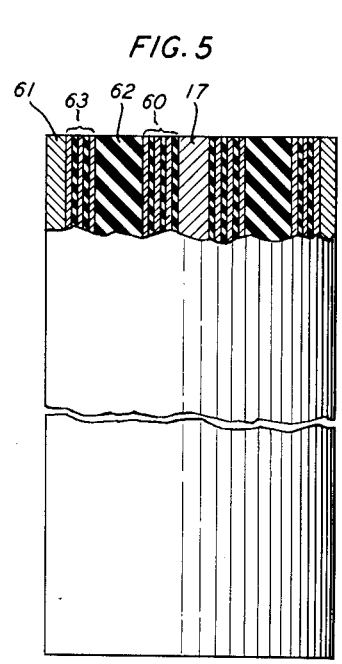
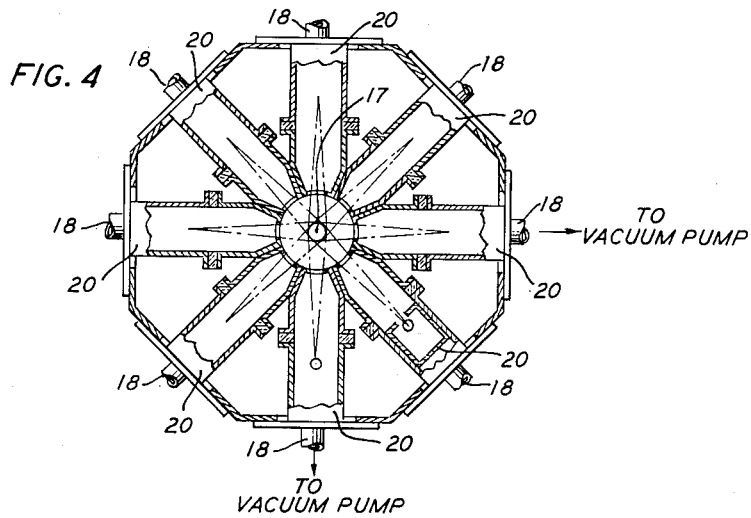
INVENTORS: F. W. REYNOLDS
G. R. STILWELL
BY
Hugh S. Wertz
ATTORNEY Feb. 14, 1956     F. W. REYNOLDS ET AL     2,734,478
APPARATUS FOR FABRICATING A COMPOSITE ELECTRICAL CONDUCTOR
Filed Dec. 29, 1951     4 Sheets-Sheet 4
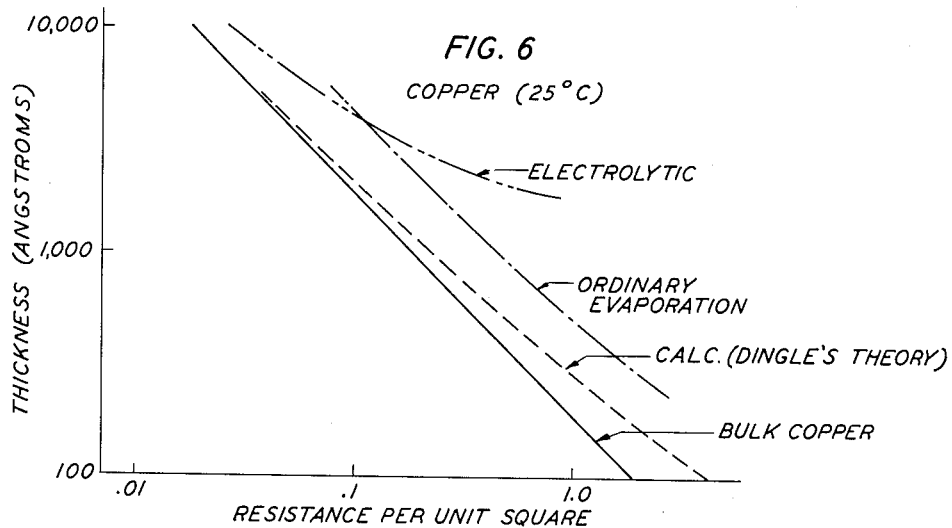
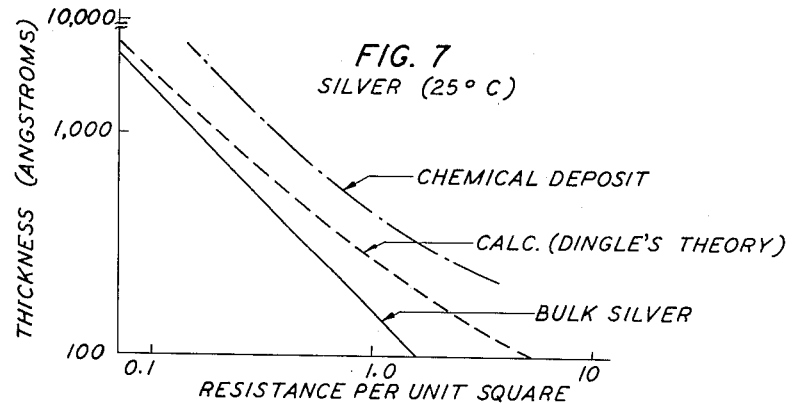
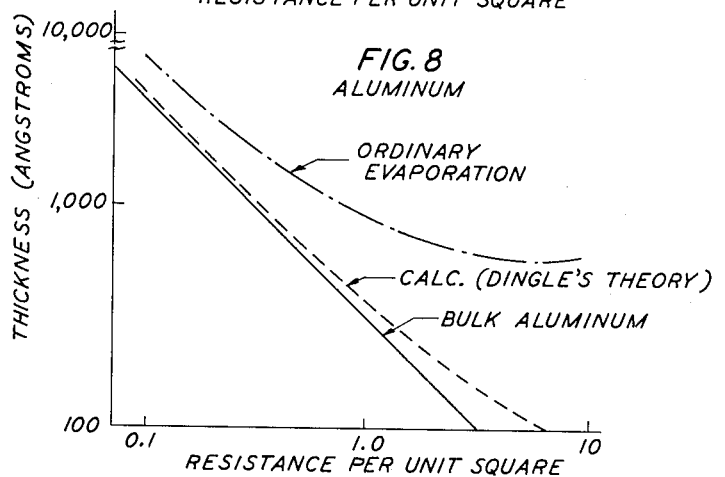
INVENTORS: F. W. REYNOLDS
G. R. STILWELL
BY
Hugh S. Wertz
ATTORNEY

United States Patent Office 2,734,478
Patented Feb. 14, 1956

2,734,478

APPARATUS FOR FABRICATING A COMPOSITE ELECTRICAL CONDUCTOR

Frederick W. Reynolds, Ridgewood, and George R. Stilwell, Plainfield, N. J., assignors to Bell Telephone Laboratories, Incorporated, New York, N. Y., a corporation of New York Application December 29, 1951, Serial No. 264,074

7 Claims. (Cl. 118—8)

This invention relates to the fabrication of electric conductors and more specifically to apparatus for fabricating composite conductors embodying a large number of very thin insulated layers of conducting material.

It is an object of this invention to provide efficient apparatus for making in cable lengths composite conductors of the type just described.

This invention, in one of its most important aspects, relates to the manufacture of composite conductors of the type which have now become generally known as "Clogston conductors" or "Clogston cables" but it will be readily apparent that the invention is not necessarily so limited. Various cables of the Clogston type are disclosed in a copending application of A. M. Clogston, Serial No. 214,393, filed March 7, 1951, each of the cables embodying one or more composite conductors comprising a multiplicity of insulated conducting elements of such number, dimensions, and disposition relative to each other and to the orientation of the electromagnetic wave being propagated therein as to achieve a more favorable distribution of current and field within the conducting material. In each of a number of specific embodiments, the composite conductor is a "stack" comprising a multiplicity of thin, coaxially arranged, metal laminations insulated from one another by thin insulating layers and arranged so that the smallest dimension of each of the laminations is in the direction perpendicular to both the direction of wave propagation and the magnetic vector. Each metal lamination is preferably many times (for example 10, 100 or even 1000 times) smaller than the factor δ which is called one skin thickness or one skin depth. The distance δ is given by the expression $$\sqrt{\frac{1}{\pi f \mu \sigma}}$$

where δ is expressed in meters, $f$ is the frequency in cycles per second, $\mu$ is the permeability of the metal in henries per meter and $\sigma$ is the conductivity in mhos per meter. The factor δ measures the distance in which the current and field penetrating into a slab of the metal many times δ in thickness will decrease by one neper; i. e., their amplitude will become equal to $$\frac{1}{e} = 0.3679 \ldots$$

times their amplitude at the surface of the slab.

It will be apparent that for frequencies in the megacycle and higher ranges, the thickness of the metal laminae and of the insulating laminae should be very small. As a matter of fact, for the upper ranges of frequencies contemplated, these thicknesses should be fractions of a thousandth of an inch thick and may be of the order of one millionth of an inch thick. As pointed out in the above-identified Clogston application, with sufficiently thin laminae, an optimum relative thickness for certain structures of this general type is that in which each insulating lamina is one-half the thickness of each metal lamina so both metal and insulating layers must be very thin.

Generally, the conductivity of a metal is independent of its size and shape. However, when the mean free path of the conduction electrons becomes comparable to the dimensions of the conductor, this is not so. This latter condition arises for very thin films at normal temperatures, and for somewhat thicker films and wires at low temperatures where the mean free path of the electrons becomes much greater than it is at normal temperatures. The conductivity under such conditions becomes a function of the size and shape of the conductor. Considerable theoretical work has been done to permit calculation of this effect. The work of Dingle (see Proceedings of the Royal Society, volume 201, page 245, 1950) which is patterned after that of Fuchs (described in the Proceedings of the Cambridge Philosophical Society, volume 34, page 100, 1938) appears to be an attempt at a rigorous theory which takes into account inelastic scattering at the metal boundary. So far as known, there has been no experimental confirmation of Dingle's theory prior to experiments leading to the present invention.

The present invention is based on the discovery that it is possible to obtain by evaporation thin films of such metals as aluminum, silver and copper which closely approach bulk conductivity (when allowance is made for effective thickness in accordance with Dingle's theory) by employing very fast rates of evaporation, such as, for example, of the order of 500 to 1000 Angstrom units per second. Common vaporization techniques employed by previous workers in this art have used but a small fraction of this rate and have yielded films which have only one-half the bulk conductivity. Moreover, films of copper produced electrolytically and silver films deposited by the usual chemical methods have much lower values of conductivity than the bulk metal. The fast evaporation employed in the present invention is well adapted to the production of laminae of the very small thickness necessary for use in cables of the "Clogston" type.

It has been found that impurities generally degrade the electrical properties of both metals and dielectrics, the conductivity being lowered and the dielectric losses increased. One of the important advantages of the present invention is that the complete fabrication of the cable is carried on in a vacuum, thus avoiding contamination from external sources.

Each of the physical embodiments of the present invention is capable of producing in a continuous process a multiplicity of very thin (preferably of the order of a few millionths of an inch), coaxially arranged, conducting laminae separated by coaxial layers of insulation of comparable thinness. Each method utilizes a very rapid evaporation technique, that is, faster by several times at least, the evaporation rate hitherto considered desirable, for obtaining both conducting and insulating layers. Servo-control mechanisms are provided to maintain the thicknesses of the conducting and dielectric layers at predetermined values. While there can be as many metallic and insulating material evaporating stations as there are number of layers in the "stack" being fabricated, as a practical matter there need not be this many stations since the cable can be passed through a number of the evaporating stations a plurality of times, either in the same direction each time or in the opposite direction.

The invention will be more readily understood by referring to the following description, taken in connection with the accompanying drawings forming a part thereof, in which:

Fig. 2 is an enlarged view of a group of evaporating stations and control stations related thereto which form part of the arrangement of Fig. 1;

Fig. 3 is a partial schematic view of apparatus forming another embodiment of the invention;

Fig. 4 is a view of one bank of evaporators taken in a plane at right angles to the axis of the cable;

Fig. 5 is a longitudinal view, with portions cut away, of one form of cable constructed in accordance with the invention; and Figs. 6, 7 and 8 are graphical representations used in explaining the invention.

Figure 1:
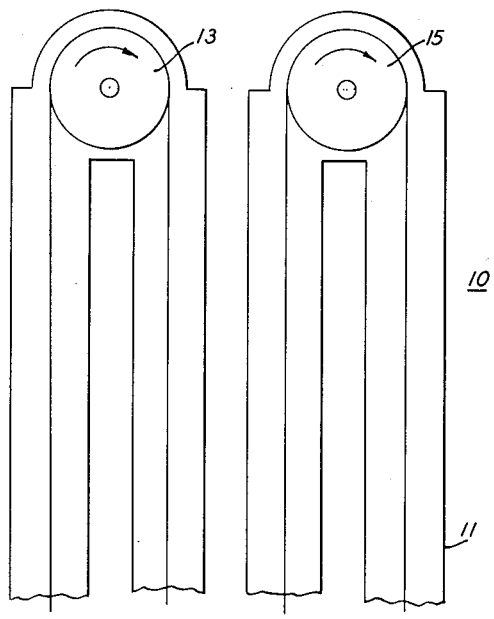
Fig. 1 is a schematic representation of apparatus for fabricating, in accordance with the invention, a laminated cable.
Figure 1:
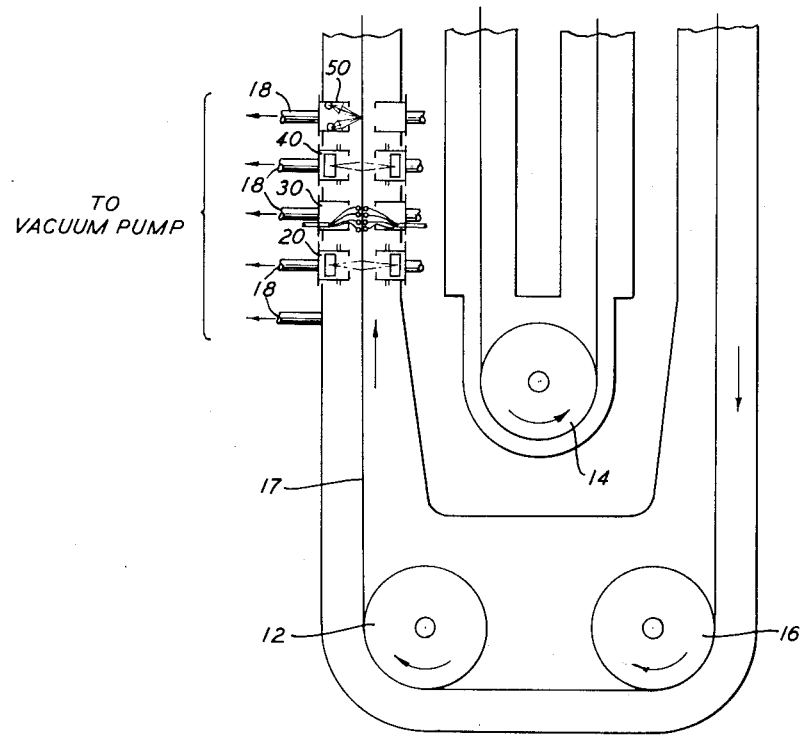

More specific reference will now be made to the drawings. Fig. 1 shows, by way of example for purposes of illustration, apparatus 10 for implementing a process, in accordance with the invention, of fabricating a multilayer cable of the "Clogston" type or any other structure including a plurality of very thin insulated conducting layers. The apparatus comprises a housing 11 having mounted therein a plurality of reels 12, 13, 14, 15 and 16 for supporting and driving a core 17 upon which the various metal and insulating laminae are applied. The core 17 may be either of metallic or dielectric material. The housing 11 is maintained at a suitable pressure, approaching vacuum, by a multiplicity of pipes 18 connected, as indicated in the drawing, to a vacuum pump or pumps. A vacuum of $10^{-5}$ millimeters of mercury is generally adequate. The cable core 17 is passed through four different types of chambers in order, the process being repeated many times until the desired number of conducting layers is obtained. The four types of chambers are: metallic evaporators 20, metal thickness control chambers 30, insulating material evaporators 40, and insulation thickness control chambers 50. These chambers are shown in somewhat greater detail in Fig. 2 which is drawn to a larger scale than that of Fig. 1.

The core 17 is first passed through a battery of metal evaporating chambers 20 which are symmetrically arranged about the cable axis as shown in Fig. 4. Each chamber 20 comprises a boxlike enclosure 21 surrounding the metal-evaporating means which is shown in Fig. 2 as a cup or boat 22 of a suitable material, such as tungsten, molybdenum or tantalum, capable of withstanding high temperatures. The cup 22 holds the material 23 to be evaporated, examples of which are copper, silver and aluminum. The material 23 is preferably in the form of a bar which is fed manually or automatically into the cup by any suitable means forming part of the equipment represented schematically in the drawing by the box 24 entitled "Evaporation Control Means" but the material may have any other form, such as a filament, for example. The heating can be by direct or alternating current through the cup 22, by a direct current or low frequency alternating current heater coil around it, or by high frequency means. The heating means also forms part of the equipment 24. Since suitable automatic material feeding and heating means are well known in the art, they have not been specifically illustrated in the drawing. The enclosure 21 is provided with an inner baffle 25 and an outer baffle 26 each of which is provided with an aperture through which the evaporated metal passes to reach the cable 17. The size of the apertures can be varied by variable diaphragms 27 and 28, respectively. The members 27 and 28 can be operated by hand or automatically by control apparatus forming part of the equipment 24 and which is operated in response to control signals from the thickness control chambers 30. Dash-dot lines 29 in the drawing indicate that the size of the openings in these diaphragms is controllable by the control apparatus 24.

It is essential that the thin layers of material evaporated on the cable 17 be of uniform thickness. In the arrangement of Fig. 4, a multiplicity of (for example, eight) evaporating chambers 20 are provided and are arranged symmetrically around the circular cable core 17. For simplicity in the drawings, the details of all the evaporators 20 in the group have not been shown but it is to be understood that all are alike. By spacing the chambers 20 geometrically from each other and by providing (as in Fig. 2) suitable baffles and controls so that the evaporators essentially act as point source radiators, a uniform thin layer of evaporated material can be deposited on the moving cable 17.

Instead of a battery of evaporators as in Fig. 4, a single evaporator can be used. Such an evaporator can take the form of a hollow sphere of tungsten or other suitable high metal point metal through which the cable is passed. It is maintained at a uniform high temperature sufficient to generate a metal vapor pressure of the desired value, for example, 1 mm. of mercury. The metal to be evaporated can be fed into the sphere automatically or manually, as in the arrangement of Fig. 1.

A control mechanism is necessary in order that the film thickness of the metal conductor may be controlled and kept uniform. Hence, after the cable 17 has a metallic layer 17A applied thereby by means of the evaporators 20, it passes into a group of control chambers 30 in which the resistance of the metal film produces a voltage drop controlling a servo-mechanism which controls the evaporation rate in the evaporators 20 by (1) changing the heating rate, (2) varying the diaphragm aperture in the baffles 25 and 26, (3) controlling the rate of material feed, or (4) making any one or more of these changes. The servo mechanism may take any one of a number of forms well known to those skilled in the art. In the embodiment here shown the servo mechanism comprises a first servo amplifier 37 and an associated servo receiver amplifier 38 of the type wherein an unbalanced signal in the servo amplifier 37 will create a corresponding signal in the receiver amplifier 38. The voltage drop across the resistance of the film 17A between the roller contact members 32 and 33 is produced by current passed between these contacts by means of the electromotive source 36 connected in a series circuit including source 36, resistor 35 and the layer between contacts 31 and 34. Any unevenness in the layer 17A produces an unbalance signal in the servo-amplifier 37, thereby producing a corresponding signal in the servo-receiver amplifier 38 which controls, by any one or more of the means described above, the rate at which the metal in the evaporator 22 is applied to the cable 17. There are as many control stations 30 as there are metallic evaporating stations 20, but for simplicity in the drawings the servo-control mechanism of one only of the stations 30 has been shown. However, the stations 30 are all alike.

After passing through the control stations 30, the cable 17 passes to the battery of evaporating chambers 40 where it has applied thereto a layer 17B of appropriate dielectric material such as, for example, manganous or magnesium fluoride, or silicon monoxide or dioxide. Each of the evaporating chambers 40 comprises an enclosure 41 having mounted therein a cup 42 containing a suitable dielectric material 43 or mixture of dielectric materials. By way of example, such materials as cryolite or zinc sulfide are useful for the purpose of filling the pores of the main dielectric film since they have greater surface mobility than the main dielectric material utilized. Heat for fabricating the material in the cup 42 is obtained by any of the means described above in connection with the chambers 20. As in the case of the metallic evaporators 20, the dielectric evaporators 40 can be arranged in a battery such as in the arrangement of Fig. 4 for example. Evaporation control means 44, similar to the equipment 24, is provided for controlling the rate of feed, the heating rate, and the aperture size in the variable diaphragms 47 and 48 in the baffles 45 and 46, respectively, by means of controls 49.

After leaving the evaporating chambers 40, the cable 17 (having a metallic layer 17A and a dielectric layer 17B coated thereon) passes through control chambers 50

(one for each evaporating chamber 40). The purpose of each control chamber is to determine the thickness of the dielectric layer 17B and to ensure that the thickness of this layer is maintained uniform by a servo-control mechanism connected back to the evaporation control means 44 in the corresponding evaporating chamber 40. The servo control mechanism may take any one of a number of forms familiar to those skilled in the art. In the embodiment here shown the servo control mechanism is the same type as that associated with the control chamber 30 and consists of a servo transmitter 55 and a servo receiver 56. The control signal is obtained by focussing light from a suitable light source 51 operating through an optical system 52 upon the layer 17B, and reflections from this layer are focussed by means of a suitable optical system 53 upon a photoelectric cell 54 which generates a voltage which is applied to the servo-transmitter 55. The member 55 is coupled to the servo-receiver 56 which produces a corresponding signal which is applied to control means 44 to control, for example, the rate of evaporation from the evaporating cup 42 and thus maintain the thickness of the film 17B at a desired value.

After the cable 17 emerges from the chamber 50, it passes in the same direction through a number of chambers (not shown for simplicity in the drawings but which are similar to the chambers 20, 30, 40 and 50, respectively), and is driven one or more times through each of the chambers by means of the various reels 12, 13, 14, 15 and 16 to have additional coats of metal and insulation applied thereto as in the first passage through these stations. Obviously, the cable can pass through these stations any desired number of times and receive any number of alternate layers of metal and insulation. Preferably 100 or more layers of each are applied to the cable before the stack is finally completed. Fig. 5 shows one such stack 60 around the core 17. If desired, this stack may extend as far as the outer shield 61 or it may extend only part way between the core 17 and the shield 61 and have the remaining space occupied in whole or in part by an intermediate dielectric member 62 and a second stack 63. The intermediate layer 62 may be applied in any convenient way. By way of example, if it is to be constructed homogeneously of dielectric material, either the same as that between the layers or a different one depending on the dielectric constant required, the cable 17 can be run through the chambers 40 and 50 a multiplicity of times with the corresponding metallic evaporating chambers 20 and the control chambers 30 disabled or, when the dielectric material is not of the same material as that in the layers in the stack 60 and it is not convenient to change over the chambers 40 to provide for this different material, additional dielectric evaporating stations can be provided. Alternatively, the cable 17 can be removed from the reels as soon as the stack 60 has been applied thereto and this cable conducted through a coating bath until the required thickness of dielectric material 62 is applied thereto but in general it is best to preserve the vacuum throughout the entire process. In any case, the stack 63 is formed on the top of the dielectric member in the apparatus in Fig. 1 in the same manner as the stack 60 is formed.

An alternative process is represented by the arrangement of Fig. 3. In this arrangement the cable core is stored on a storage reel 70 and motors (not shown) attached to the reel 70 and its opposite storage reel 71 can be controlled to run in either direction. Thus when the entire cable core 17 under construction has made one pass through the chain of evaporating chambers 20 and 40 (only a few of which are shown in Fig. 3) and stored on the reel 71, the direction of travel is reversed and the partially constructed cable is passed back through the evaporating chambers 20 and 40 again. Monitoring control chambers 30 are located on either side of the metallic evaporating chambers 20, and monitoring control chambers 50 are located on either side of the dielectric evaporating chambers 40. When the cable core is traveling clockwise during fabrication, monitoring control chambers 30B are connected as part of the servo-control mechanism for the metal evaporators 20. Similarly, control chambers 50B are connected to actuate the servo-control mechanism for the dielectric evaporators 40. When the cable core has made one pass through the chain of evaporating stations 20 and 40, the feed is reversed so that the cable 17 runs through the evaporating stations in the opposite direction. In this case the control chambers 50B and 30B are disabled and control of the evaporation process is switched to control chambers 30A and 50A. Moreover, if the last layer applied in the clockwise direction is a metallic one, the chamber which applied this last layer is also disabled for the counterclockwise run so that the first layer applied in the latter run is a dielectric one. This method of constructing the cable 17 by running it through the evaporators in both directions is frequently more economical of the space required for the vauum equipment. Obviously a cable such as that shown in Fig. 5 can be made with this method as well as with the method of Fig. 1, it being understood that the intermediate dielectric member can be constructed by passes through the evaporators in both directions.

An important feature of the present invention is the very fast rate of evaporation employed, a typical rate being, for example, of the order of 500 to 1000 Angstrom units per second. This rate is many times the rate usually employed in evaporation techniques. The effectiveness of the method in accordance with the invention can be seen by examining Figs. 6, 7 and 8 which are plots of layer thickness, in Angstrom units, against resistance per unit square in arbitrary units, Fig. 6 showing curves for copper, Fig. 7 showing curves for silver and Fig. 8 showing curves for aluminum. In each of these three figures, the solid curves are insulated bulk metal values of the actual materials used for the evaporated layers. The dotted curves are calculated from Dingle's theory (see the Proceedings of the Royal Society, volume 201, 1950). The mean free paths for the conduction electrons in these metals at room temperature are taken as follows: Copper 400 Angstrom units; silver 570 Angstrom units; and aluminum 300 Angstrom units. In the dash-dot curves, typical results obtained by other methods of layer deposition are shown. Thus in Fig. 6, the dash-dot curve represents copper deposited by an electrolytic method and in Fig. 7 the dot-dash curve represents a layer obtained by chemical deposition method while in Fig. 8 the dot-dash curve represents aluminum produced by ordinary evaporation. The results of data obtained on layers produced by the relatively fast evaporation technique of the present invention (that is, evaporation in vacuum at the rate of from 500 to 1000 Angstrom units per second) have not been shown since they approximately coincide with the curves representing the calculated values according to Dingle's theory as far down the curve as a film thickness of from 400 to 500 Angstrom units, depending upon the metal.

It is to be understood that the above-described embodiments are illustrative of the application of the principles of the invention. Numerous modifications may be devised by those skilled in the art without departing from the spirit and scope of the invention.

What is claimed is:

1. Apparatus for fabricating a relatively long composite conductor comprising alternate thin layers of metal and dielectric material, which comprises a multiplicity of evacuated thermal evaporating chambers for rapid application of thin metal layers to dielectric material, a multiplicity of evacuated thermal evaporating chambers for rapid application of dielectric layers to conducting material, a multiplicity of control chambers for determining the thickness of applied metal and insulating layers, control means associated with each of said control chambers for controlling the thickness of applied metal and insulating layers, and means for conducting a core member successively through a metal evaporating chamber, a metal thickness control chamber, a dielectric evaporating chamber, and a dielectric thickness control chamber.

2. Apparatus for fabricating a relatively long composite conductor comprising alternate thin layers of metal and dielectric material, which comprises a multiplicity of evacuated thermal evaporating chambers for rapid application of thin metal layers to dielectric material, a multiplicity of evacuated thermal evaporating chambers for rapid application of dielectric layers to conducting material, a multiplicity of control chambers for determining the thickness of applied metal and insulating layers, control means associated with each of said control chambers for controlling the thickness of applied metal and insulating layers, and means for conducting a core member a plurality of times through a group of chambers including at least one metal evaporating chamber, one metal thickness control chamber, one dielectric evaporating chamber, and one dielectric thickness control chamber.

3. Apparatus for fabricating a relatively long composite conductor comprising alternate thin layers of metal and dielectric material, which comprises a multiplicity of evacuated thermal evaporating chambers for rapid application of thin metal layers to dielectric material, a multiplicity of evacuated thermal evaporating chambers for rapid application of dielectric layers to conducting material, a multiplicity of control chambers for determining the thickness of applied metal and insulating layers, control means associated with each of said control chambers for controlling the thickness of applied metal and insulating layers, and means for conducting a core member in the same direction a plurality of times through a group of chambers including at least one metal evaporating chamber, one metal thickness control chamber, one dielectric evaporating chamber, and one dielectric thickness control chamber.

4. Apparatus for fabricating a relatively long composite conductor comprising alternate thin layers of metal and dielectric material, which comprises a multiplicity of evacuated thermal evaporating chambers for rapid application of thin metal layers to dielectric material, a multiplicity of evacuated thermal evaporating chambers for rapid application of dielectric layers to conducting material, a multiplicity of control chambers for determining the thickness of applied metal and insulating layers, control means associated with each of said control chambers for controlling the thickness of applied metal and insulating layers, and means for conducting a core member in opposite directions in alternate time periods through a group of chambers including at least one metal evaporating chamber, control chamber, one dielectric evaporating chamber, and one dielectric thickness control chamber.

5. The combination of elements as in claim 1 in which said metal thickness control chamber includes spaced roller contact members contacting the metal layer for determining any unevenness thereof, and the control means associated with said chamber includes a servo-mechanism responsive to any such unevenness for controlling the rate of evaporation of the metal in said evacuated thermal evaporating chamber for rapid application of thin metal layers.

6. The combination of elements as in claim 1 in which said dielectric thickness control chamber comprises electro-optical means for determining any unevenness in the dielectric layer applied to the core, and the control means associated with said chamber includes a servo-mechanism responsive to any such unevenness for controlling the rate of evaporation of the dielectric material in said evacuated thermal evaporation chamber for rapid application of dielectric layers.

7. The combination of elements as in claim 1 in which said metal evaporating chambers and said dielectric evaporating chambers are arranged in groups symmetrically spaced around the core to ensure even thickness of layers.

References Cited in the file of this patent

UNITED STATES PATENTS

| | | |
|---|---|---|
| 2,382,432 | McManus et al. | Aug. 14, 1945 |
| 2,384,500 | Stoll | Sept. 11, 1945 |
| 2,465,713 | Dimmick | Mar. 20, 1951 |
| 2,545,576 | Godley | Mar. 20, 1951 |